United States Patent
Oag et al.

(10) Patent No.: US 12,508,787 B2
(45) Date of Patent: Dec. 30, 2025

(54) METHODS AND APPARATUS FOR PRODUCING CONTACT LENSES

(71) Applicant: CooperVision International Limited, Fareham (GB)

(72) Inventors: Robert Oag, Southampton (GB); Edward James Harley Evans, Southampton (GB); Robin Frith, Southampton (GB)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 62 days.

(21) Appl. No.: 18/641,470

(22) Filed: Apr. 22, 2024

(65) Prior Publication Data

US 2024/0359415 A1     Oct. 31, 2024

(30) Foreign Application Priority Data

Apr. 28, 2023   (GB) .................................. 2306295

(51) Int. Cl.
 *B29D 11/00* (2006.01)

(52) U.S. Cl.
 CPC .. *B29D 11/00067* (2013.01); *B29D 11/00173* (2013.01); *B29D 11/0048* (2013.01)

(58) Field of Classification Search
 CPC .............. B29D 11/00; B29D 11/00076; B29D 11/00067; B29D 11/00173; B29D 11/0048
 See application file for complete search history.

(56) References Cited

U.S. PATENT DOCUMENTS

| | | | | |
|---|---|---|---|---|
| 4,944,899 A * | 7/1990 | Morland | ......... | B29D 11/00057 425/150 |
| 5,857,358 A * | 1/1999 | De Vries, Jr. | ....... | C03B 27/0417 425/389 |
| 5,938,810 A * | 8/1999 | De Vries, Jr. | ....... | C03B 23/0355 65/288 |
| 2007/0035049 A1* | 2/2007 | Bruce | ................ | B29D 11/0024 264/1.36 |
| 2008/0048350 A1* | 2/2008 | Chen | ...................... | G02B 1/043 264/2.6 |

(Continued)

FOREIGN PATENT DOCUMENTS

| TW | I655247 B | 4/2019 |
|---|---|---|
| WO | 2008062321 A2 | 5/2008 |

OTHER PUBLICATIONS

Second Written Opinion issued in corresponding International Patent Application No. PCT/GB2024/051088 dated Dec. 10, 2024 (4 pages).

(Continued)

*Primary Examiner* — Nahida Sultana
(74) *Attorney, Agent, or Firm* — Kilyk & Bowersox, P.L.L.C.

(57) ABSTRACT

The present invention concerns methods and an apparatus for producing contact lenses, such as silicone hydrogel contact lenses, and further relates to methods and an apparatus for producing silicone hydrogel contact lens mold assemblies, methods and apparatus for producing silicone hydrogel contact lenses using such mold assemblies, and silicone hydrogel contact lenses and lens member bodies produced using such methods and apparatus.

18 Claims, 12 Drawing Sheets

(56) References Cited

U.S. PATENT DOCUMENTS

| | | | |
|---|---|---|---|
| 2011/0249235 A1* | 10/2011 | Duis | G02C 7/04 |
| | | | 264/1.36 |
| 2013/0188125 A1 | 7/2013 | Goodenough et al. | |
| 2014/0183767 A1* | 7/2014 | Hong | B29D 11/00038 |
| | | | 264/2.6 |
| 2017/0307779 A1 | 10/2017 | Marullo et al. | |
| 2021/0221080 A1* | 7/2021 | Coonce | B29C 51/46 |

OTHER PUBLICATIONS

Response to Second Written Opinion filed Jan. 22, 2025 in corresponding International Patent Application No. PCT/GB2024/051088 (13 pages).

International Preliminary Report on Patentability issued in corresponding International Patent Application No. PCT/GB2024/051088 dated Jul. 16, 2025 (15 pages).

PCT Demand filed Oct. 1, 2024 in corresponding International Patent Application No. PCT/GB2024/051088 (19 pages).

International Search Report and Written Opinion issued in corresponding International Patent Application No. PCT/GB2024/051088 issued Jul. 22, 2024 (16 pages).

Search and Exam Report issued in corresponding United Kingdom Patent Application No. GB2306295.3 issued Oct. 30, 2023 (5 pages).

Office Action issued in corresponding Taiwan Patent Application 113115050 mailed Oct. 17, 2025 (10 pages).

* cited by examiner

METHODS AND APPARATUS FOR PRODUCING CONTACT LENSES

This application claims priority to United Kingdom Patent Application No. 2306295.3, filed Apr. 28, 2023, which is incorporated in its entirety by reference herein.

The present disclosure concerns methods and apparatus for producing contact lenses, more particularly, but not exclusively, silicone hydrogel contact lenses. In particular, the present disclosure concerns methods and apparatus for producing silicone hydrogel contact lens mold assemblies, methods and apparatus for producing silicone hydrogel contact lenses using such mold assemblies, and silicone hydrogel contact lenses and lens member bodies produced using such methods and apparatus.

BACKGROUND

Commercial production of contact lenses may involve cast molding. In a cast molding process, a lens precursor material is dispensed into a first mold member (typically a female mold member). A second mold member (typically a male mold member) is then placed in contact with the first mold member to form a lens-shaped cavity containing the lens precursor material. The first and second mold members are then coupled together to form a contact lens mold assembly. The lens precursor material is then cured, for example by applying heat and/or light or other suitable polymerizing means to the mold assembly, thereby producing a polymerized lens member body in the cavity between the mold members. The lens member body is then removed from the mold assembly. The lens member body may be subject to further finishing steps, for example conventional finishing steps such as extraction and/or hydration, to produce the finished lens member. A contact lens may comprise a single lens member, or two or more lens members joined together.

Various techniques have been developed in order to couple the first and second mold members together. One such method is known as 'heat staking', and an example heat staking process is described in WO 2008/062321 published in the name of CooperVision International Holding Company, LP, the contents of which are incorporated herein by reference. In a heat staking process, elongate members, for example with heated tips, are inserted into the first and second mold members to melt or soften the mold material and thereby form a weld between the mold members. It would be advantageous to provide an improved heat staking process, for example a heat staking process in which the rate of defects in the resulting lens member bodies is reduced.

Particularly in high volume commercial manufacturing, the process of placing the second mold member on the first mold member may also be a source of defects in the lens member bodies produced using the resulting mold assembly. Defects may occur if the first and second mold members are not correctly aligned. Accordingly, it would be advantageous to provide a method in which the first and second mold members are more accurately, precisely and/or reliably aligned. This may be a particular issue when the first and second mold members are designed to form an interference fit when placed together to define the lens cavity. Accordingly, it would be advantageous to provide an improved method for closing and coupling mold members to form a lens mold assembly in which the first and second mold members form an interference fit.

Lens members of the prior art typically taper to a thin point as they approach the peripheral edge. In an alternative design, known as a "feather edge" design, the front and back surfaces converge over a relatively long distance and the lens member has a thicker and more rounded profile at the peripheral edge. Such "feather edge" designs appear to be particularly prone to defects when produced by cast molding in a lens mold assembly of the type discussed above. It would be advantageous to provide an improved cast molding process for such "feather edge" lenses, for example a cast molding process in which the rate of defects in the resulting lens member bodies is reduced.

The present disclosure seeks to mitigate the above-mentioned problems. Alternatively or additionally, the present disclosure seeks to provide improved apparatus and/or methods for use in producing silicone hydrogel contact lens mold assemblies. Alternatively or additionally, the present disclosure seeks to provide improved apparatus and/or methods for use in for producing lens member bodies and/or contact lenses using silicone hydrogel contact lens mold assemblies.

SUMMARY

In a first aspect, the present disclosure provides a method of producing a silicone hydrogel contact lens mold assembly (that is a contact lens mold assembly for producing a silicone hydrogel contact lens). The method comprises placing one of a male mold member and a female mold member on the other of a male mold member and a female mold member to form a contact lens mold assembly comprising a contact lens shaped cavity defined between the male mold member and the female mold member. Said cavity contains a polymerizable silicone hydrogel contact lens precursor composition. The method comprises coupling the male mold member and the female mold member together by inserting one or more heated elongate elements into the male and female mold members thereby causing a portion of the male and/or female mold members to become melted or softened, and then withdrawing said one or more heated elongate elements from the male and female mold members. Said melted or softened material then cools to form a weld between the male and female mold members. Throughout a first time period beginning when the first of said one or more heated elongate elements is inserted into the male and female mold members and continuing until at least 3 seconds after the last of said one or more heated elongate elements is withdrawn from the male and female mold members, the male and female mold members are pressed together (or held together) by applying a force in the range of from 20 N to 100 N to the male and female mold members.

In a second aspect, the present disclosure provides a system for the production of a silicone hydrogel contact lens mold assembly, the mold assembly comprising a contact lens shaped cavity defined between a male mold member and a female mold member. The system comprises a clamp arranged to compress the mold assembly. The system comprises one or more elongate elements, said elongate elements being mounted for movement relative to the clamp to pass a tip of each elongate element through the male and female mold members while they are being compressed by the clamp. The system comprises a control system configured to control operation of the clamp and elongate elements such that throughout a first time period beginning when the first of said one or more heated elongate elements is inserted into the male and female mold members and continuing until at least 3 seconds after the last of said one or more heated elongate elements are withdrawn from the male and female mold members, the clamp exerts a force in the range of from 20 N to 100 N on the male and female mold members.

In a third aspect, the present disclosure provides a batch of at least 100 silicone hydrogel contact lens member bodies and/or silicone hydrogel contact lenses wherein each lens member body is or comprises a molded body produced using the lens mold assembly and/or method of the first aspect, or system of the third aspect, and wherein each lens member body/lens of said batch has a thickness of less than 0.10 mm measured at a radial distance 0.10 mm from the edge of the lens member body/lens, and the standard deviation of diameter, base curve and sagittal depth of the lens member bodies/lenses across the batch is less than 0.07 mm.

Optional but preferred features are set out in the dependent claims.

It will of course be appreciated that features described in relation to one aspect of the present disclosure may be incorporated into other aspects of the present disclosure. For example, the method of the disclosure may incorporate any of the features described with reference to the apparatus of the disclosure and vice versa.

DESCRIPTION OF THE DRAWINGS

Example embodiments will now be described, by way of example only, with reference to the accompanying schematic drawings, of which.

DETAILED DESCRIPTION

Figure 1:
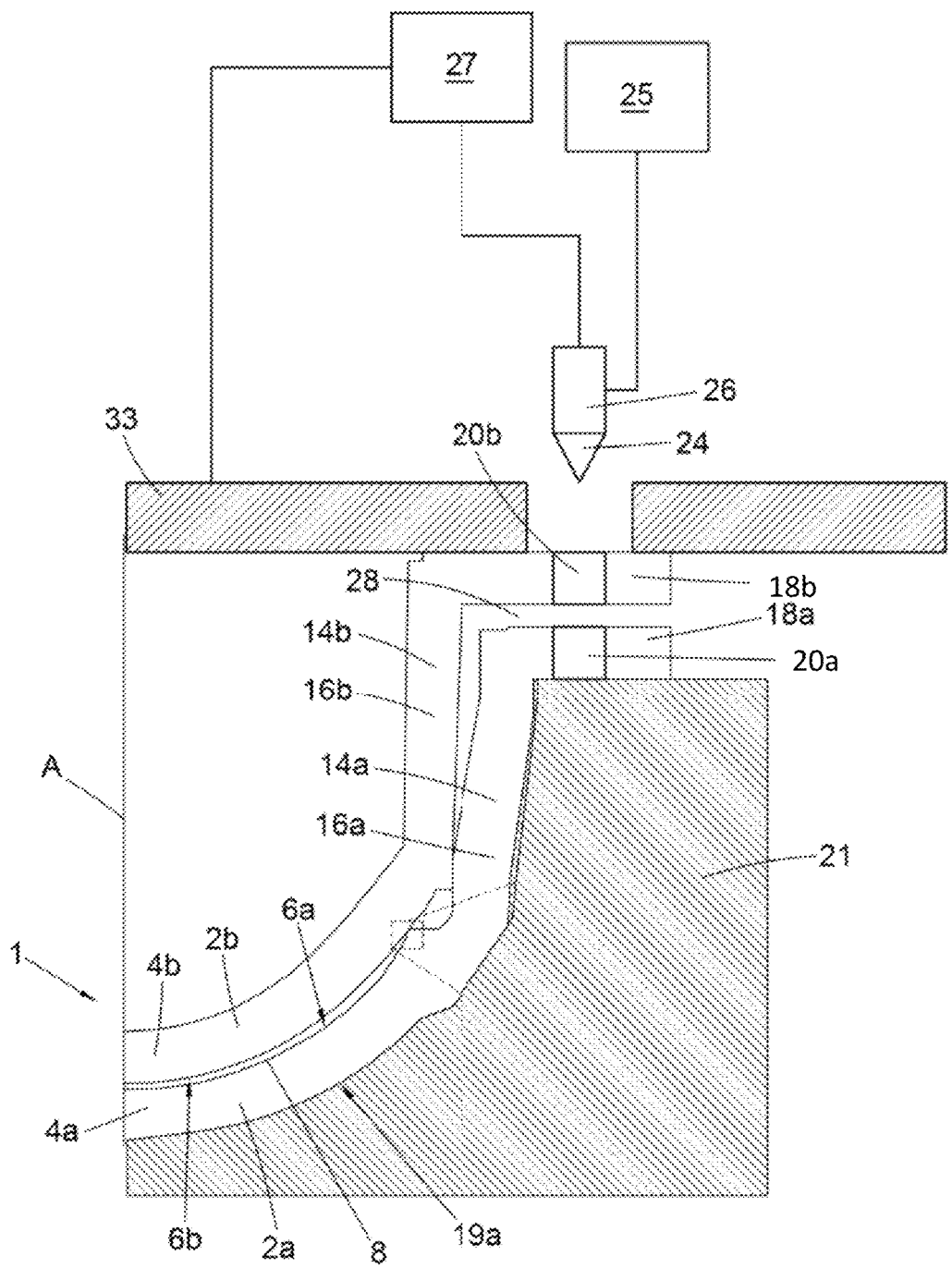
FIG. 1 shows a lens mold assembly in accordance with an example embodiment.

According to a first aspect of the disclosure, there may be provided a method of producing a silicone hydrogel contact lens mold assembly. The method may comprise placing one of a male mold member and a female mold member on the other of a male mold member and a female mold member to form a contact lens mold assembly. The contact lens mold assembly may comprise a contact lens shaped cavity defined between the male mold member and the female mold member. Said cavity may contain a polymerizable silicone hydrogel contact lens precursor composition. The method may comprise coupling the male mold member and the female mold member together by inserting one or more heated elongate elements into the male and female mold members, which may, thereby cause a portion of the male and/or female mold members to become melted or softened. The method may comprise then withdrawing said one or more heated elongate elements from the male and female mold members. It may be that said melted or softened material then cools to form a weld between the male and female mold members. It may be that throughout a first time period beginning when the first of said one or more heated elongate elements is inserted into the male and female mold members and/or continuing until at least 3 seconds after the last of said one or more heated elongate elements is withdrawn from the male and female mold members, the male and female mold members are pressed together. The male and female mold members may be pressed together by applying a force in the range of from 20 N to 100 N to the male and female mold members.

Thus, the mold assembly is formed by placing the male and female molds together and coupling the mold members together using a heat-staking process. The method may comprise pressing the molds together with a force in the range of from 20 N to 100 N during, and for a period of at least 3 seconds after, heat staking. Carrying out the heat-staking process in accordance with the present method has been found to result in a significantly reduced rate of defects in the lens member bodies/lens members produced using the resulting lens mold assembly. Without wishing to be bound by theory, it is believed that maintaining a force in the stated range during, and for a period of time after, the heated elongate elements are withdrawn may provide improved scaling. Maintaining the force after withdrawal of the heated elongate elements may allow for the melted or softened portion to solidify further and thereby provide an improved weld, but in order to be beneficial, the force must not be too low (in which case it has little impact on the scaling) or too high which risks warping the lens members, moving the lens member out of alignment and/or causing edge defects in the lens member bodies/lens members by forcing precursor composition out of the edges of the lens shaped cavity.

For the purposes of the present application, a female mold member may be defined as a mold member comprising a concave or bowl-shaped lens-defining surface. A male mold member may be defined as a mold member comprising a convex or dome-shaped lens-defining surface. A mold member may comprise a convex lens-defining surface, and a concave lens-defining surface on the opposite face of the member to the convex surface. In that case, such a mold member may be classified as male or female depending on which surface is being used to define the lens-shaped cavity in question. It may be that the lens shaped cavity is defined between a convex lens-defining surface and a concave lens-defining surface. One or more surface coatings may be present on the or each lens-defining surface.

Energy, for example heat and/or electrical energy is provided to each heated elongate element in order to heat the element. For example, energy may be provided continuously to the heated element(s) through a time period beginning when the first of said one or more heated elongate elements is inserted into the male and female mold members and ending when the last of said one or more heated elongate elements is withdrawn from the male and female mold members. Alternatively, energy may be provided intermittently to the heated element(s) through a time period beginning when the first of said one or more heated elongate elements is inserted into the male and female mold members and ending when the last of said one or more heated elongate elements is withdrawn from the male and female mold members. Each heated element may be at a temperature of from 220 to 270° C., for example of 230° C. before and/or during insertion into the male and female mold members.

It may be that the force is applied to the male and female mold members by a clamp, for example by a clamp contacting one or both of the male and female mold members. The clamp may comprise a clamp foot that contacts the male and/or female mold member to exert a force thereon. The clamp foot may comprise an elongate member that contacts the male or female mold member at a distal end. The clamp foot may comprise a plate that that contacts the male or female mold member at a distal end.

It may be that one of the male and female mold members rests on a support during, for example throughout, the step of the male and female mold members being joined together. Pressing the male and female mold members together may comprise compressing the male and female mold members between said support and the clamp foot. It may be that the clamp foot, for example a distal surface of the clamp foot, is placed on the one of said male and female molds members that is positioned furthest from the support. Said male or female mold member may have a back surface, being the surface on the opposite face of the mold member to the lens-defining surface. Said back surface may have a rearmost region, being those regions of the back surface located farthest from the support.

The force applied to the male and female mold members may be substantially constant throughout the first time period. Alternatively, the force applied may vary within the stated range. The force may be applied (substantially) parallel to the central axis of the mold members.

It may be that the female and male mold members are pressed together by applying a force in the range of from 50 N to 80 N, for example 55 to 75 N, to the male and female mold members, throughout said first time period.

The method may comprise applying the force of from 20 N to 100 N as a pressure of from 0.05 to 0.36 $N/mm^2$ to a surface region of the male and/or female mold member. The method may comprise applying the force of from 50 N to 80 N as a pressure of from 0.13 to 0.29 $N/mm^2$ to a surface region of the male and/or female mold member. The method may comprise applying the force of from 55 N to 75 N as a pressure of from 0.14 to 0.27 $N/mm^2$ to a surface region of the male and/or female mold member.

It may be that said male mold member and/or said female mold member comprise, consist essentially of, or consist of polypropylene. It may be that said polypropylene has a melt flow rate (MFR) in the range of from 18 dg/min to 20 dg/min, for example 19 dg/min, at 230° C. and 2.16 kg. It may be that said polypropylene has a tensile modulus in the range of from 1600 MPa to 2000 MPa (measured at 1 mm/min), for example 1800 MPa (measured at 1 mm/min). It may be that said polypropylene has a flexural modulus of from 1700 MPa to 2100 MPa, for example 1900 MPa (measured at 1%/minute). An example of such a polypropylene is Saudi Basic Industries Corporation (SABIC) PP PCGH19.

MFR is measured in accordance with ISO standard 1133: 2005 (fourth edition). This process is well known to the skilled person, and is summarised as follows. The procedure uses an apparatus comprising a heated barrel having a bore (of diameter 9.5 mm) formed therein. A die, 8 mm in length and having an opening of 2 mm extending along is axis, is located in one end of the bore. A piston is located in the other end of the bore, such that the force exerted on a sample located in the bore by the piston causes the molten extrusion of the molten polymer out of the opening in the die. The process is as follows:
(i) 5 grams of the polypropylene is inserted into the bore;
(ii) the sample is preheated for 5 minutes at 230° C.
(iii) after the preheating a standard weight of 2.16 kg is applied to the piston causing molten polymer to flowing out through the opening in the die.
(iv) the amount of material extruded from the die at the end of a test period is weighed and the melt flow rate in dg/min is calculated by dividing the mass of the material extruded by the duration of the test period.

Tensile modulus is measured in accordance with ISO standard 527-2:2012. The procedure is carried out using a universal testing machine by applying a tensile force to a sample until it yields. The procedure uses injection molded Type 1A specimens, with a width of 10 mm, a thickness of 4 mm and a gauge length of 75 mm. This process is well known to the skilled person.

Flexural modulus is measured in accordance with ISO standard 178:2019. The flexural modulus is calculated using a 3-point flexure test in which the specimen is placed on two anvils and bent via a central die. The procedure uses injection molded Type 1A specimens, with a width of 10 mm, a thickness of 4 mm and a gauge length of 75 mm. This process is well known to the skilled person.

It may be that said first time period continues until at least 5 seconds after the last of said one or more heated elongate elements is withdrawn from the male and female mold members. It may be that said first time period continues for from 3 to 7 seconds, for example from 5 to 7 seconds after the last of said one or more heated elongate elements is withdrawn from the male and female mold members. A period of from 3 to 7 seconds may advantageously reduce the defect rate without unduly slowing production.

It may be that the step of placing one of a male mold member and a female mold member on the other of a male mold member and a female mold member to form a contact lens mold assembly comprises dropping one of the male or female mold member onto the other of the male and female mold member. As used herein, dropping may be defined as allowing the mold member to fall under the action of gravity alone. The method may comprise releasing the mold member so that it drops onto the other mold member, for example releasing the mold member from a handling device, for example a pick-up device, that has moved the mold member into alignment with the other mold member. Releasing the mold member may comprise releasing a vacuum that previously held the mold member against the handling device.

Thus, the method may comprise dropping one of the male and female mold member onto the other of the male and female mold member rather than placing the two mold members in contact and/or pressing one mold member onto the other. The male mold member may be dropped onto the female mold member, or vice versa. It has been found that dropping the mold member further reduces the rate of defects in the lens member bodies/lens members produced using the lens mold assembly. Without wishing to be bound by theory, it is believed that dropping the mold member may provide improved scaling by allowing the dropped mold member to move freely relative to the other mold member during the initial contact, thereby achieve improved alignment between the male and female mold members.

It may be that the mold member is dropped from a height of from 0.5 mm to 5 mm, for example from 1 mm to 3 mm. This range was found to provide particular benefits in terms of reducing the rate of defects. Without wishing to be bound by theory, it is believed that this range provides sufficient momentum to the mold member so that movement takes place on initial contact, but without resulting in excessive moment which could itself misalign the mold members. It may be that the mold member is dropped from a height of 1 mm. The height may be defined as the vertical distance between the initial points of contact between the male mold member and the female mold member. The initial points of contact are the regions on the male and female mold members at which the mold members first make contact as they are moved together to form the lens mold assembly. The points of initial contact may be identified by moving the mold members towards each other as if to form the lens mold assembly and noting the regions at which the mold members first make contact.

It may be that a second time period begins when the male mold member contacts the female member during placing of the said one of the male and female mold members on the other of the male and female mold members. It may be that the second time period ends when the male and female mold members are first pressed together by applying the force. The second time period may last at least 3 seconds, for example at least 5 seconds. It may be that the second time period ends at the same time as the first time period starts. Alternatively, it may be that there is an intervening time period, between the first and second time periods, during which time the male and female mold members are being pressed together, but while the first of the more heated elongate elements has yet to be inserted into the male and female mold members. The intervening time period may be at least 3 seconds, for example at least 5 seconds.

Thus, the method may comprise delaying the start of the heat-staking process, after the mold members have been placed together. It has been found that briefly delaying the start of the heat-staking process further reduces the rate of defects in the lens member bodies/lens members produced using the lens mold assembly. Without wishing to be bound by theory, it is believed that this delay may improve scaling by giving the first and second mold members time to settle into their final alignment before they are pressed together.

The method may comprise dropping one of the male and female mold members onto the other of the male and female mold members, and then waiting for at least 3 seconds, for example at least 5 seconds, before pressing the male and female mold members together.

It may be that the male and female mold members form an interference fit when pressed together. In an interference fit (also known as a friction fit) the male mold member is held in place relative to the female mold member by friction between the male and female mold members, for example as a result of the shape and dimensions of the mold members causing the male mold member to press on the female mold member while the mold members define the lens shaped cavity. Without wishing to be bound by theory, it is believed that the present disclosure may be of particular application in lens mold assemblies where the mold members form such an interference fit. For example, pressing the molds together with the force as described above may increase the likelihood of a good interference fit without adversely impacting on the risk of mold member deformation. In turn, this may reduce the defect rate in lens member bodies/lens member produced using the mold assembly of the present disclosure. Additionally or alternatively, the improved alignment that may be provided by dropping one mold member onto the other, and/or delaying the start of the heat staking process may increase the likelihood of a good interference fit and/or reduce the risk of mold member deformation, and thereby reduce the defect rate in lens member bodies/lens member produced using the mold assembly of the present disclosure.

It may be that the volume of lens precursor composition in the cavity and/or the volume of the cavity itself, is from 40 µl to 60 µl, for example from 45 µl to 55 µl, for example 50 µl.

It may be that inserting an elongate element into the male and/or female mold member comprises forming a bore in a region of the male mold member and/or a bore in a region of the female mold member. The bore is formed by softening or melting the mold material at the region. It may be that the softened or molten mold material passes from the bore. It may be that the softened or molten mold material from the bore(s) occupies a space between the male and female mold members, and when the mold material cools or hardens, it acts as a weld between the male and female mold members. The bore in the male and/or female mold member may extend completely through the mold member. Thus, it may be that the elongate element is inserted into one side of a mold member and passes through the mold member to exit the mold member on a second side, the second side being opposite to the first side. It may be that inserting an elongate element into the male and female mold members comprises passing said elongate element through the male and female mold members. Thus, it may be that the elongate element is inserted into one side of the mold assembly and passes through the mold assembly to exit the mold assembly on a second side, the second side being opposite to the first side. It may be that the mold members are secured together by forming a plurality of spaced apart bores, for example five or more bores, in the peripheral regions of the first and second mold members.

It may be that each mold member of the present disclosure comprises a lens shaped portion and a peripheral region circumscribing the lens shaped portion. The lens shaped portion defines the lens-defining surface. The peripheral region can be a flange, extending radially from the lens shaped region. For example, the female mold member includes a concave lens-shaped surface defining an anterior surface of a contact lens, and the male mold member includes a convex lens-shaped surface defining a posterior surface of a contact lens. When coupled together as a mold assembly, the male and female mold members form a lens-shaped cavity between the lens shaped portion and/or lens-defining surface of the female mold member and the lens shaped portion and/or lens-defining surface of the male mold member.

In certain embodiments, the first and second mold members are substantially identically structured relative to each other. Thus, the female and male mold members are substantially identical, and each includes a concave lens-defining surface and a convex lens-defining surface. For example, each of the mold members includes both a first lens shaped surface defining an anterior surface of a contact lens and a substantially opposing second lens shaped surface defining a posterior surface of a contact lens.

Each mold member may have a back surface on the opposite side of the mold member to the lens-defining surface. The back surface may comprise a planar surface region, for example the back surface of a flange. The back surface may comprise a curved surface portion, for example the back surface of the lens-defining portion. It may be that the force is applied to the back surface of the male and/or female mold member. It may be that the force is applied as a pressure evenly distributed across one or both of the planar surface region and the curved surface region. The method may comprise applying the force of from 20 N to 100 N as a pressure of from 0.07 N/mm² to 0.36 N/mm² to the planar surface region. The method may comprise applying the force of from 50 N to 80 N as a pressure of from 0.18 N/mm² to 0.29 N/mm² to the planar surface region. The method may comprise applying the force of from 55 N to 75 N as a pressure of from 0.20 N/mm² to 0.27 N/mm² to the planar surface region. The method may comprise applying a force of from 20 N to 100 N as a pressure of from 0.05 N/mm² to 0.26 N/mm² to the planar surface region and the curved surface region. The method may comprise applying a force of from 50N to 80 N as a pressure of from 0.13 N/mm² to 0.21 N/mm² to the planar surface region and the curved surface region. The method may comprise applying a force of from 55N to 75 N as a pressure of from 0.14 N/mm² to 0.20 N/mm² to the planar surface region and the curved surface region.

Each mold member may have an outer radius of from 6 mm to 14 mm, for example from 8 mm to 12 mm, for example of 11 mm. The planar surface region may extend inwards from the outer radius. The inner radius of the peripheral zone may be from 4.5 mm to 7 mm, for example from 5 mm to 6 mm, for example 5.5 mm.

It may be that the clamp, for example the clamp foot, for example the distal surface of the clamp foot, contacts the back surface of the male and/or female lens member when pressing the male and female mold members together. It may be that said clamp contacts the or each mold member across the majority of, for example the whole of, the planar surface region of the back surface. It may be that said distal surface of the clamp foot is substantially planar. It may be that said clamp contacts the mold member across the majority of, for example the whole of, the curved surface region of the back surface. It may be said distal surface conforms to the back surface of the mold member.

The method may further comprise the step of placing a lens precursor composition on a lens shaped region and/or lens-defining surface of a mold member, for example the female mold member. Once the mold member has received the lens precursor composition, the other of the male and female mold member is placed in contact with the said mold member to form a contact lens mold assembly with the polymerizable contact lens precursor composition occupying the lens shaped cavity between the mold members.

The silicone hydrogel contact lens precursor material may comprise a polymerizable contact lens precursor material having a silicone containing polymerizable component. As understood in the field of contact lenses, a hydrogel is a material that retains water in an equilibrium state and is free of a silicone-containing chemical. A silicone hydrogel is a hydrogel that includes a silicone-containing chemical. Silicone hydrogel materials, as described in the context of the present disclosure, have an equilibrium water content (EWC) of at least 10% to about 90% (wt/wt). In some embodiments, the silicone hydrogel material has an EWC from about 30% to about 70% (wt/wt). Examples of suitable lens formulations include those having the following United States Adopted Names (USANs): comfilcon A, enfilcon A, stenfilcon A, fanfilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, kalifilcon A, and the like. The contact lens, lens member and/or lens member bodies of the present disclosure may comprise a silicone hydrogel material and/or one of the formulations listed above.

In a second aspect of the disclosure, there is provided method of making a silicone hydrogel contact lens member comprising forming a silicone hydrogel contact lens mold assembly according to the method of the first aspect. The method may further comprise exposing the lens mold assembly to radiation to polymerize the polymerizable silicone hydrogel contact lens precursor composition to produce a contact lens body. The method may further comprise separating the male mold member from the female mold member, leaving the contact lens body in contact with the male and/or female mold member. The method may further comprise removing the contact lens body from said male and/or female mold member. The method may further comprise extracting extractable materials from the contact lens body and/or hydrating the contact lens body, to form a silicone hydrogel contact lens member.

In a third aspect of the disclosure there is provided a system for the production of a silicone hydrogel contact lens mold assembly. The mold assembly may comprise a contact lens shaped cavity defined between a male mold member and a female mold member. The system may comprise one or more of a clamp arranged to compress the mold assembly; one or more elongate elements, said elongate elements being mounted for movement relative to the clamp to pass a tip of each elongate element through the male and female mold members while they are being compressed by the clamp; and a control system. It may be that the control system is configured to control operation of the clamp and elongate elements such that throughout a first time period, which may begin when the first of said one or more heated elongate elements is inserted into the male and female mold members and/or which may continue until at least 3 seconds after the last of said one or more heated elongate elements are withdrawn from the male and female mold members, the clamp exerts a force in the range of from 20 N to 100 N on the male and female mold members.

The system may further comprise a support configured to retain a first mold member in a fixed location. It may be that said first mold member is one of the male mold member and the female mold member, and a second mold member is the other of the male mold member and female mold member. It may be that the support is configured to retain the male or female mold member, for example to substantially prevent radial and/or axial movement of the mold member when being subjected to force by the clamp. The support may comprise a recess shaped to confirm to the back surface of the male and/or female mold member.

It may be that the clamp comprises a clamp foot arranged to press the male and female mold members together. For example, the clamp foot may be arranged to compress the first and second mold members between the clamp foot and the support when the first mold member is retained in the support and the second mold member is placed on the first mold member to define the lens shaped cavity therebetween. It may be that the control system is configured to control operation of the clamp such that throughout the first time period the clamp foot exerts a force in the range of from 20 N to 100 N on the second mold member.

The system further comprises one or more elongate element(s). Each elongate element may have a tip. The element, for example said tip may be configured for connection and/or operatively connected, to a source of energy, for example heat and/or electrical energy, such that in use, said source of energy provide energy to heat the elongate element, for example the tip. The system may comprise or be connected to said energy source. The system may comprise a heater, configured to heat said elongate element, for example said tip. It may be that each elongate element is mounted for movement relative to the mold support, for example such that the elongate element can pass through a male mold member and a female mold member placed together on the support. Each elongate element may take the form of a rod, for example a rod having the tip at the distal end. Such elongate elements will be known to the skilled person, and are described in WO 2008/062321. The tip can be made of a variety of materials effective in softening or heating plastic materials. The tip may be tapered or pointed. Examples of suitable tip materials include copper, aluminum, stainless steel, and alloys of elements including copper, nickel, bronze and combinations thereof.

It may be that the system comprises one or more sensors configured to detect the position of the elongate heated elements and/or one or more sensors configured to determine the force exerted on the male and female mold members by the clamp, and wherein the control system is configured to control operation of the clamp and/or elongate heated elements in dependence on a signal received from said one or more sensors.

The system may further comprise a second support, which is configured to and/or in use, retains one of the male or female mold member in a substantially fixed location. The system may comprise a pick-up head which is configured to and/or in use, retains, the other of the male or female mold member on the end thereof. It may be that the control system is configured to control the position of the pick-up head to position one mold member above the other mold member. It may be that the control system is configured to control the pick-up head to release the mold member from a height of from 1 mm to 3 mm above the other mold member. The second support may be the same support as used during insertion of the elongate elements, or a different support.

In a further aspect of the disclosure there is provided a batch of at least 100 silicone hydrogel contact lens member bodies, wherein each lens member body is a molded body produced using the lens mold assembly and/or method of any of any other aspect and/or the system of any other aspect. It may be that each body of said batch has a thickness of less than 0.10 mm measured at a radial distance 0.10 mm from the edge of the lens member body. It may be that the standard deviation of diameter, base curve and sagittal depth of the lens member bodies across the batch is less than 0.07 mm. Said lens member bodies may have any of the features described above or below in connection with any other aspect.

In a further aspect of the disclosure there is provided a batch of at least 100 silicone hydrogel contact lenses, wherein each lens comprises a molded lens member produced using the method of any of any other aspect and/or the system of any other aspect. It may be that each lens of said batch has a thickness of less than 0.10 mm measured at a radial distance 0.10 mm from the lens edge. It may be that the standard deviation in the diameter, base curve and sagittal depth of the lenses across the batch is less than 0.07 mm. Said lenses may have any of the features described above or below in connection with any other aspect.

Prior art methods of producing such 'feather edge' lenses using case molding provide a high number of defects, and no known methods produce an error rate of less than 1 in 100. Accordingly, the batches of molded 'feather edge' lens member bodies and/or lenses of the present disclosure can be reliably produced using the methods and apparatus of the present disclosure. It will be appreciated that the lenses of a batch are sequentially produced. As used herein 'sequentially produced' means that batch is composed of lenses produced one after another without any intervening lenses which do not form part of the batch. A batch can be identified at output from a manufacturing process. It will be appreciated that the lenses of a batch are produced using the same method.

It may be that a lens, lens member and/or lens member body produced using the lens mold assembly of the present disclosure has a thickness of at least 10 µm when measured at a distance of 50 µm from the peripheral edge, for example a thickness of at least 15 µm when measured at a distance of 60 µm from the peripheral edge. The thickness is the distance between the anterior and posterior surfaces of the lens, lens member and/or lens member body in a direction parallel to the central axis of the lens, lens member and/or lens member body respectively. It may be that the lens, lens member and/or lens member body has a thickness of at least 20 µm, for example at least 25 µm, for example at least 30 µm, when measured at a distance of 60 µm from the peripheral edge. The measurement of the distance from the peripheral edge of the lens, lens member and/or lens member body may be along a measurement line orthogonal to a tangent of the peripheral edge, the line extending and passing through the central axis of the lens, lens member and/or lens member body respectively. The central axis of the lens, lens member and/or lens member body is located in the centre of the lens, lens member and/or lens member body when viewed in plan view. For example, if the lens, lens member and/or lens member body is elliptical in shape when viewed in plan view, then the centre and the central axis is located at the point exactly half-way between the two focal points of the ellipse. For example, if the lens, lens member and/or lens member body is a circle when viewed in plan view, then the centre and the central axis of the lens, lens member and/or lens member body is located at the centre of the circle. The central axis of the lens, lens member and/or lens member body may be located at the mid-point of the longest diameter of the membrane, when the lens, lens member and/or lens member body is viewed in plan view. It is believed lenses, lens members and/or lens member bodies with this type of geometry may be particularly susceptible to sealing-related defects.

Likewise, the lens shaped cavity defined between the male mold member and the female mold member may have a thickness of at least 10 µm when measured at a distance of 50 µm from the peripheral edge of the cavity. It may be that the cavity has a thickness of at least 15 µm when measured at a distance of 60 µm from the peripheral edge of the cavity. The thickness is the distance between the lens-defining surfaces forming the cavity in a direction parallel to the central axis of the mold members. It may be that the cavity has a thickness of at least 20 µm, for example at least 25 µm, for example at least 30 µm, when measured at a distance of 60 µm from the peripheral edge of the cavity. The measurement of the distance from the peripheral edge of the cavity may be along a measurement line orthogonal to a tangent of the peripheral edge of the cavity, the line extending and passing through the central axis of the mold members. The central axis of a mold member is located in the centre of the lens-shaped region when viewed in plan view. For example, if the lens-shaped region is elliptical in shape when viewed in plan view, then the centre and the central axis of the mold member is located at the point exactly half-way between the two focal points of the ellipse. For example, if the lens-shaped region is a circle when viewed in plan view, then the centre and the central axis of the mold member is located at the centre of the circle. The central axis of the mold member may be located at the mid-point of the longest diameter of the lens-shaped region, when the mold member is viewed in plan view.

It may be that a lens, lens member and/or lens member body produced using the lens mold assembly of the present disclosure has a thickness of less than 0.10 mm measured at a radial distance 0.10 mm from the lens edge. It may be that a lens, lens member and/or lens member body produced using the lens mold assembly of the present disclosure has a thickness of less than 0.08 mm at a radial distance 0.10 mm from the lens edge. It may be that a lens, lens member and/or lens member body produced using the lens mold assembly of the present disclosure has a thickness of less than 0.08 mm at a radial distance 0.07 mm from the lens edge. It may be that a lens, lens member and/or lens member body produced using the lens mold assembly of the present disclosure has a thickness of less than 0.05 mm at a radial distance 0.07 mm from the lens edge.

Likewise, the lens shaped cavity defined between the male mold member and the female mold member may have a thickness of less than 0.10 mm measured at a radial distance 0.10 mm from the peripheral edge of the cavity. It may be that the lens shaped cavity defined between the male mold member and the female mold member has a thickness of less than 0.08 mm at a radial distance 0.10 mm from the peripheral edge of the cavity. It may be that the lens shaped cavity defined between the male mold member and the female mold member has a thickness of less than 0.08 mm at a radial distance 0.07 mm from the peripheral edge of the cavity. It may be that the lens shaped cavity defined between the male mold member and the female mold member has a thickness of less than 0.05 mm at a radial distance 0.07 mm from the peripheral edge of the cavity.

The contact lens may be for correcting or improving vision associated with myopia, presbyopia, hyperopia, astigmatism or another refractive anomaly.

It may be that each lens, lens member and/or lens member body comprises an optic zone. The optic zone encompasses the parts of the lens that have optical functionality in use. The optic zone may be configured to be positioned over or in front of the pupil of an eye when in use. It may be that each lens, lens member, and/or lens member body has an optic zone and a peripheral zone. The optic zone may be centered on an optical axis. The optical axis may be defined as the axis about which the optic zone is rotationally symmetric. The lens, lens member and/or lens member body may comprise a central optic zone and an annular peripheral zone surrounding the central optic zone.

The contact lens or contact lens member blank may be substantially circular in shape. The contact lens/lens member blank may have a diameter from 4 mm to 20 mm inclusive, for example from 10 mm to 20 mm inclusive. The optic zone of the contact lens/blank may be substantially circular in shape and may have a diameter from 2 mm to 10 mm inclusive. In some embodiments, the contact lens/blank has a diameter from 13 mm to 15 mm, for example a diameter of 14 mm, and the optic zone has a diameter from 7 mm to 9 mm, for example 8 mm. It may be that the contact lens, lens member and/or lens member blank has a convex anterior surface and/or a concave posterior surface.

Figure 2:
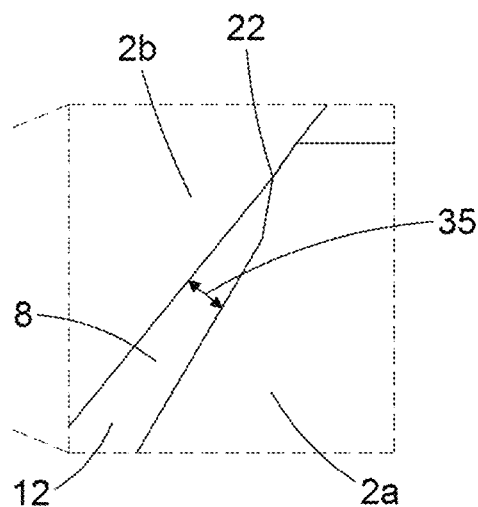
FIG. 2 shows a close up of a portion of the lens mold assembly of FIG. 1.

With reference to FIG. 1 and FIG. 2 there is shown a cross-sectional view of a contact lens mold assembly 1 according to a first example embodiment of the disclosure. The mold assembly 1 is rotationally symmetric about a central axis labelled A in FIG. 1. However, it will be appreciated that in other embodiments, for example where toric lenses are being produced, mold assembly may not be rotationally symmetric. The mold assembly comprises a female mold member 2a having a concave lens-shaped region 4a which defines a concave lens-defining surface 6a.

The mold assembly comprises a male mold member 2b having a convex lens-shaped region 4b which defines a convex lens-defining surface 6b. The convex lens-shaped region 4b is received within the bowl-shaped volume defined by the concave lens-shaped region 4a. A lens-shaped cavity 8 is defined between the concave lens-shaped region 4a and the convex lens-shaped region 4b. A lens-precursor composition 12 is contained within the lens-shaped cavity 8. Each mold member 2a, 2b, comprises a peripheral region 14a, 14b. The peripheral region 14a, 14b circumscribes the lens-shaped region 4a, 4b, which is substantially circular when viewed in plan. The peripheral region 14a, 14b comprises a vertically extending portion 16a, 16b, extending substantially parallel to the axis A, and a flange 18a, 18b, extending substantially horizontally outward from the upper end of vertically extending portion 16a, 16b. A bore 20a, 20b is formed the flange 18a, 18b of each mold member 2a, 2b. Only one pair of bores 20a, 20b is shown in FIG. 1, but it will be appreciated that a plurality of pairs of bores 20a, 20b are formed spaced apart around the circumference of the mold assembly 1. In some embodiments, five pairs of bores 20a, 20b are formed in the mold assembly 1, equidistantly spaced around the circumference. Each bore 20a, 20b extends through the flange 18a, 18b in which it is formed, and is parallel with the axis A. For each pair, the bore 20a of the female mold member 2a is located immediately beneath the bore 20b of the male mold member 2b. Thus, the bore 20a is coaxial with the bore 20b. The male mold member 2b contacts the female mold member 2a to define the peripheral edge 22 of the cavity 8. The lower regions of the vertically extending portions 16a, 16b of the mold members 2a, 2b are also in contact. In some embodiments, the male mold member 2b is received in the female mold member 2a in an interference fit, for example between the vertically extending portions 16a, 16b. In some embodiments the volume of the cavity 8, and the lens precursor composition 12 in the cavity 8, is from 40 μl to 60 μl, for example from 45 μl to 55 μl. In FIG. 1 a rod 26 having a heated tip 24 at its distal end is shown positioned above the bores 20a, 20b. The rod 26 is connected to a control unit 27 via one or more actuators (not shown), and an energy source 25, the connections being shown schematically in FIG. 1. Again, while a single rod 26 is shown in FIG. 1 it will be appreciated that a plurality of rods are used, with each rod producing a corresponding pair of bores 20a, 20b. A clamp plate 33 is resting atop the flange 18b of the male mold member 2b and extends across the whole of the diameter of the mold assembly 1. The clamp plate 33 is connected to the control unit 27 via one or more actuators (not shown), the connections being shown schematically in FIG. 1. The female mold member 2a rests in a support 21 which conforms to the shape of the back surface 19a of the female mold member 2a.

In some embodiments, the mold members 2a, 2b consist essentially of polypropylene having a MFR of 19 dg/min at 230° C. and 2.16 kg, a tensile modulus of 1800 MPa (measured at 1 mm/min) and a flexural modulus of 1900 MPa (measured at 1%/minute). In some embodiments the mold members 2a, 2b consist essentially of SABIC PP PCGH19.

In use, the heated tip 24 of the rod 26 is passed through the flanges 18a, 18b to form the bores 20a, 20b, by melting or softening the mold material. The melted or softened material (not shown) enters the space 28 between the flanges 18a, 18b and thereby forms a weld between the female mold member 2a and the male mold member 2b when the material cools and hardens. The mold members 2a, 2b are pressed together by the clamp plate 33 acting against the support 21, such that the mold members 2a, 2b are compressed between the clamp plate 33 and the support 22. The clamp plate 33 exerts a force in the range of 20N to 100N on the mold members 2a, 2b throughout the time period beginning when the rod 26 is inserted into the male mold member 2b, and lasts for at least 3 seconds after the rod 26 is withdrawn from the male and female mold members 2a, 2b. Without wishing to be bound by theory, it is believed that maintaining this force throughout the heat-staking process improves the quality of the weld, while maintaining the force after the elongate elements have been withdrawn allows the weld to cool and harden further, thereby reducing the risk that the molds are moved out of alignment when the force is removed.

FIG. 2 shows a close up of the mold assembly 1 of FIG. 1 in the region of the peripheral edge 22 of the cavity 8. In some embodiments, the thickness 35 of the cavity 8 (and the corresponding thickness of the lens mold body formed therein) is at least 10 μm when measured at a distance of 50 μm from the peripheral edge 22.

Figure 3:
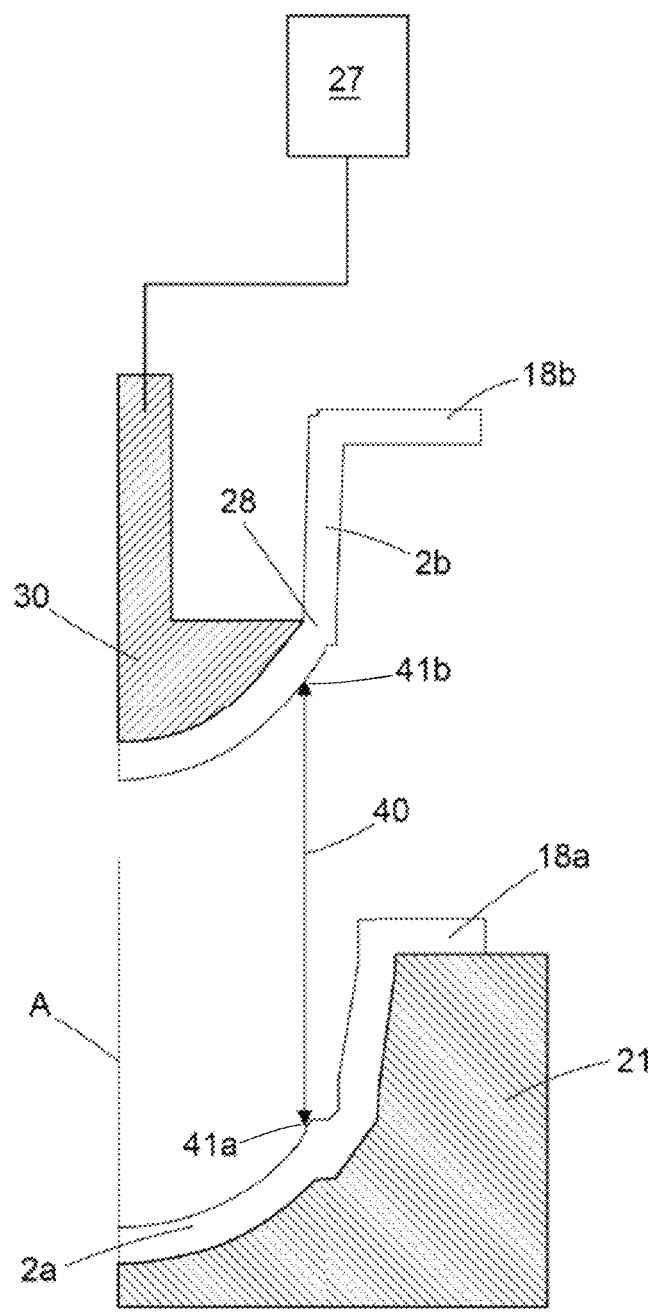
FIG. 3 shows the male and female mold members of FIG. 1 before they are placed together.

FIG. 3 shows a cross sectional view of the female mold member 2a and male mold member 2b of FIG. 1 before the male mold member 2b is placed on the female mold member 2a. The female mold member 2a is received in a support 21. The male mold member 2b is held by a vacuum pick up head 30, and is located above and coaxial with the female mold 2a. In some embodiments, the male mold member 2b is held at a height 40 of 1 mm to 3 mm above the female mold member, the height 40 being the vertical distance between the regions of initial contact 41a, 41b of the male and female mold members 2a, 2b. In FIG. 3, the regions of initial contact 41a, 41b are in the region of the peripheral edge 22 of the cavity 8. The pick up head 30 is connected to a control system 27, the connection being shown schematically in FIG. 3. The same component numbering as used for FIGS. 1 and 2 is used in FIG. 3 where applicable.

In use, the control system 27 causes vacuum pick up head 30 to release the male mold member 2b, and the male mold member 2b drops onto the female mold member 2a. In other embodiments, the male mold member 2b is placed in contact with the female mold member 2a while being held on the vacuum pick up head 30. In yet further embodiments, the male mold member 2b may be pressed onto the female mold member 2a by the vacuum pick up head 30. It will be appreciated that in other embodiments, alternative types of pick up head may be used in placed of the vacuum pick up head 30, alternative types of handling equipment may be used and/or placement may be carried out manually.

Figure 4A:
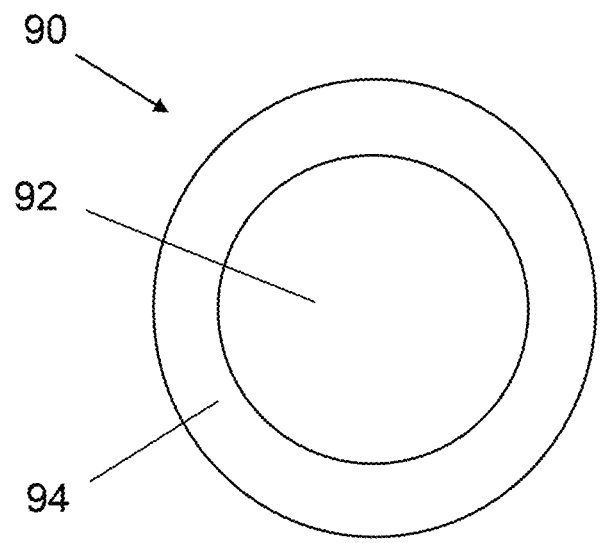
FIG. 4A and FIG. 4B show plan and cross-sectional views respectively of a lens member in accordance with an example embodiment.
Figure 4B:
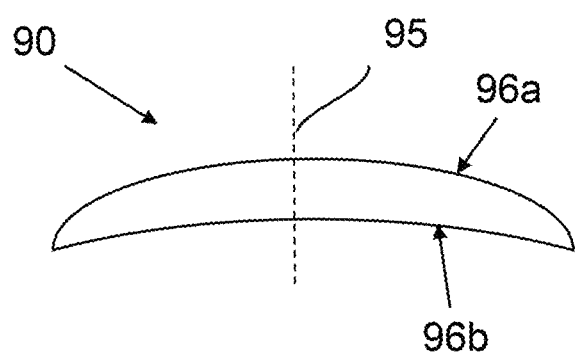

FIG. 4A and FIG. 4B show a plan view and a cross sectional view respectively, of a contact lens 90 that can be made using the mold assembly of FIG. 1. The lens 90 is formed of a single contact lens member and a single contact lens member body. The lens 90 is substantially circular when viewed in plan and has a central, substantially circular, optic zone 92 surrounded by an annular peripheral zone 94. An optic axis 95 runs through the centre of the optic zone 92, perpendicular to the front and rear surfaces 96a, 96b of the lens 30 at the centre.

Figure 5:
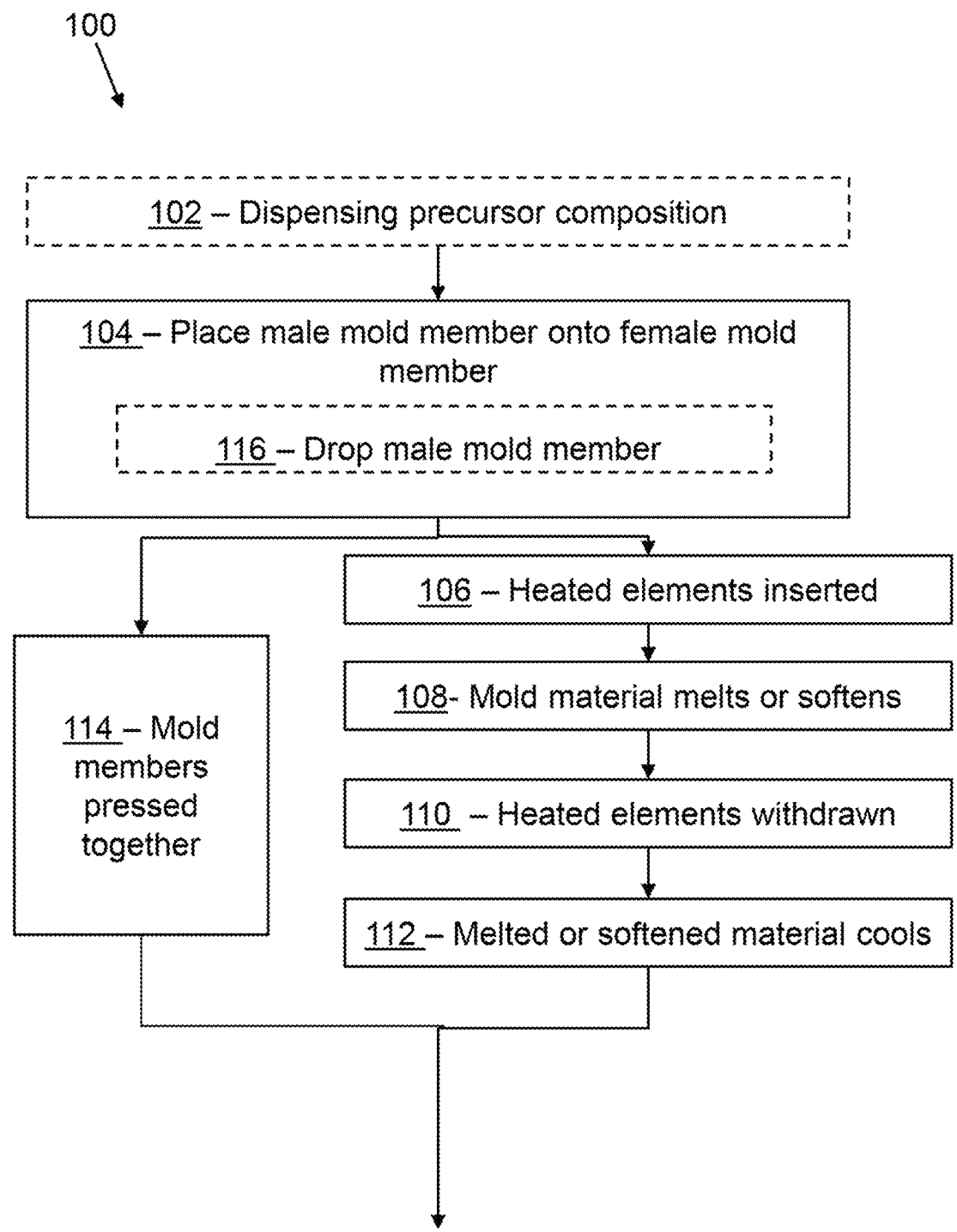
FIG. 5 shows an example method in accordance with the present disclosure.

FIG. 5 shows a flow chart of an example method 100 of producing a contact lens mold assembly in accordance with the present disclosure. The method is suitable for use with the mold assembly 1 described above. Optional steps are denoted with a dashed line in FIG. 5. Optionally, the method comprises dispensing 102 a polymerizable silicone hydrogel contact lens precursor composition into the lens-defining region of a female mold member. A male mold member is then placed 104 onto the female mold member so as to define a lens-shaped cavity with the precursor composition located therein. One or more heated elongate elements are inserted 106 into the male and female mold members, thereby causing a portion of the mold material of the male and female mold members to melt or soften 108. Optionally, the heated elongate elements are passed through the male and female mold members during steps 106 and 108. The heated elongate elements are then withdrawn 110, and the melted or softened material cools 112 to form a weld between the male and female mold members. Throughout a first time period, which begins when the first heated elongate element is inserted 106, and continues for at least 3 seconds after the last heated elongate element is withdrawn 110, the male and female mold members are pressed together 114 with a with a force in the range of from 20 N to 100 N applied to the male and female mold members.

Optionally, the step of placing 104 the male mold member onto the female mold member comprises dropping 116 the male mold member from a height of from 1 mm to 3 mm. Optionally, the method may comprise delaying pressing together 114 the male and female mold members, for a second time period of at least 3 seconds, after the male mold member is placed on the female mold member.

Further conventional steps (not shown) may then be carried out as follows in order to produce a contact lens using the lens mold assembly:
  i) curing the lens precursor composition in the cavity to form a lens member body;
  ii) opening the lens mold assembly by separating the male and female mold members;
  iii) removing the lens member body from the mold member on which it is retained;
  iv) extracting extractable materials from the contact lens body and/or hydrating the contact lens body to form a silicone hydrogel contact lens member.

While the method has been described here with reference to a lens precursor composition dispensed onto the female mold member and dropping the male mold member, it will be appreciated that the method may equally find application when a lens precursor composition is dispensed onto the male mold member and/or the female mold member is dropped onto the male mold member.

In the following studies, the lens member body used had a diameter of 14 mm with a tolerance of ±0.2 mm. Assuming the tolerance represents a +/−3 normal distribution, this gives σ=0.07 mm (0.2 mm/3). The same tolerance applied to the base curve (BC) and sagittal depth (SAG). Thus, in the following, a batch having σ<0.07 mm for diameter, BC and SAG was taken to represent good dimensional control. References to diameter in the following are to mean diameter. The lens composition was a silicone hydrogel contact lens formulation having the United States Adopted Name (USAN) Riofilcon A+DAB (4,4'-Diallyloxybenzophenone) monomer. The mold members were made of polypropylene, more specifically SABIC PP PCGH19. The resulting lens bodies had a thickness of 45 μm at a distance of 70 μm from the peripheral edge.

Figure 6:
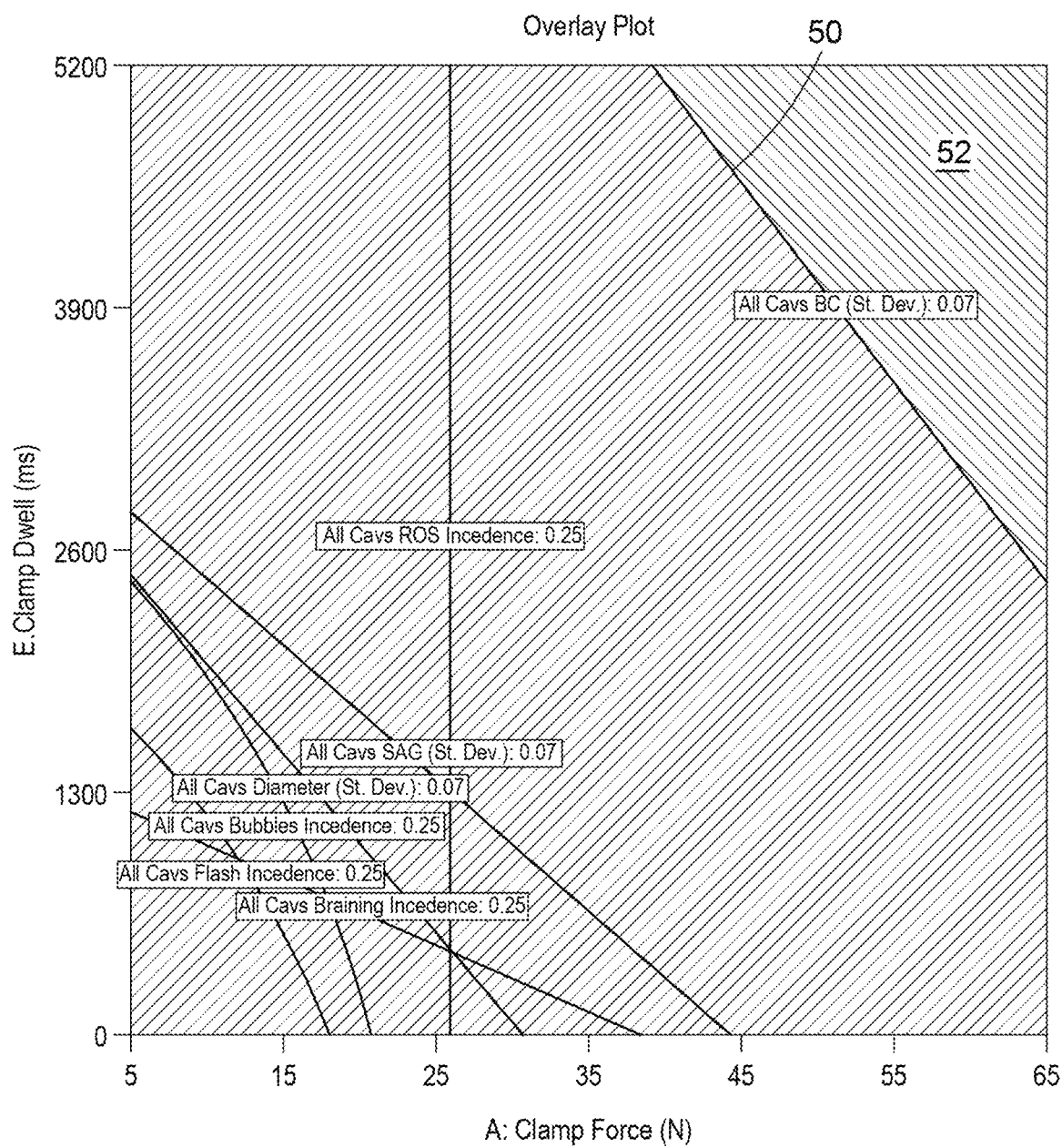
FIG. 6 shows the results of a study considering the impact of clamp dwell and clamp force on defect rates in the resulting contact lens members.

FIG. 6 shows the outcome of a trial formulated to identify the impact of clamp force (the force with which the male and female mold members are pushed together) and clamp dwell time (the time period for which the clamp force was maintained on the mold assembly after the heating elements were withdrawn) on the defect rate of a lens member body produced using a lens mold assembly in which elongated heated elements are used to weld the mold members together in accordance with the methods described herein. The composition was manually dispensed (via hand pipette) into a female mold member resting in a mold support, and the male mold member was manually placed on top. A pneumatic clamp foot was used to press down on the male mold member and thereby press the male and female mold members together. A set of heated pins were then driven by a servo-motor into, through and back out of the male and female mold members so that five spot welds were created. The clamp foot was left in place for a set time after the pins were withdrawn. After the clamp foot was retracted, the resulting mold assembly is removed from the machine.

Twenty runs were carried out with each run involving sixty mold pairs. The clamp force was varied across the 20 runs at intervals from 5 N to 65 N. The clamp dwell time was varied across the 20 runs at intervals from 0 seconds to 5.2 seconds. Other variables were held constant or found to have no significant impact on defect rates. The resulting lens member bodies were inspected, and for each run, the standard deviation in diameter, SAG and BC was calculated. The lenses were also inspected for closure-related visual defects in the following categories: bubbles, flash, braining and round-one-side (ROS, a deformation in which the lens is rounder than it should be in the region of the outer edge on at least one side of the lens when viewed in cross section). In FIG. 6 a line 50 extends from a point at 40N clamp force, 5.2 seconds dwell time to a point at 65N clamp force, 2.4 seconds dwell time. In the region 52 above the line 50, the diameter, SAG and BC standard deviations were calculated as being less than 0.07 mm and ROS, bubbles, flash and braining levels were all calculated as less than <0.25% per defect category. Thus, the results shown in FIG. 6 illustrate increased force and dwell time reduce defect rates.

Figure 7A:
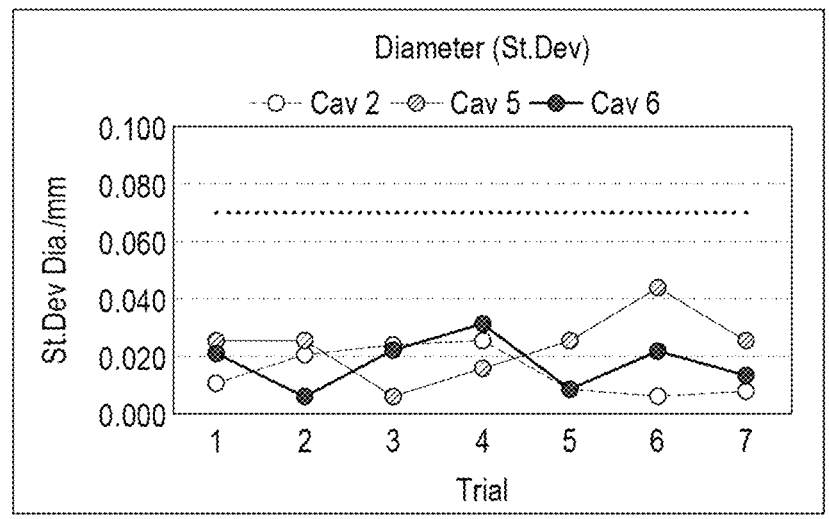
FIG. 7A and FIG. 7B show variations in diameter and base curve respectively, for contact lens members produced during a further study considering the impact of clamp dwell and clamp force on defect rates.
Figure 7B:
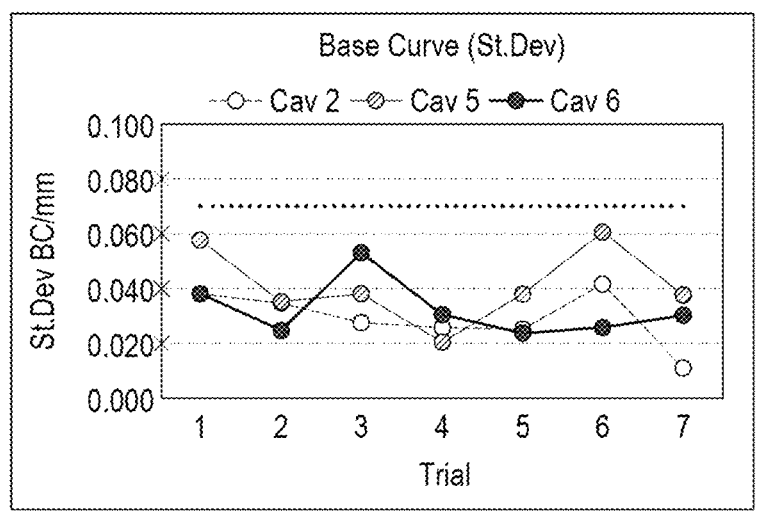

Seven further runs were carried out using clamp forces of from 55 N to 75 N and clamp dwell times of from 3 seconds to 7 seconds. Each run involved three sets (or cavities, e.g. 'cav 2', 'cav 5', 'cav 6'), each set comprising twenty mold assemblies (giving sixty mold assemblies in total). FIGS. 7A and 7B show the standard deviations for the three cavities across all seven trials for diameter (FIG. 7A) and base curve (FIG. 7B). The standard deviation of diameter, SAC and BC was less than 0.07 mm (marked with a dashed line in FIGS. 7A and 7B) in all cases. Each of the defects of ROS, RBS, bubbles, flash and braining were present in less than 0.25% of the lenses.

Figure 8A:
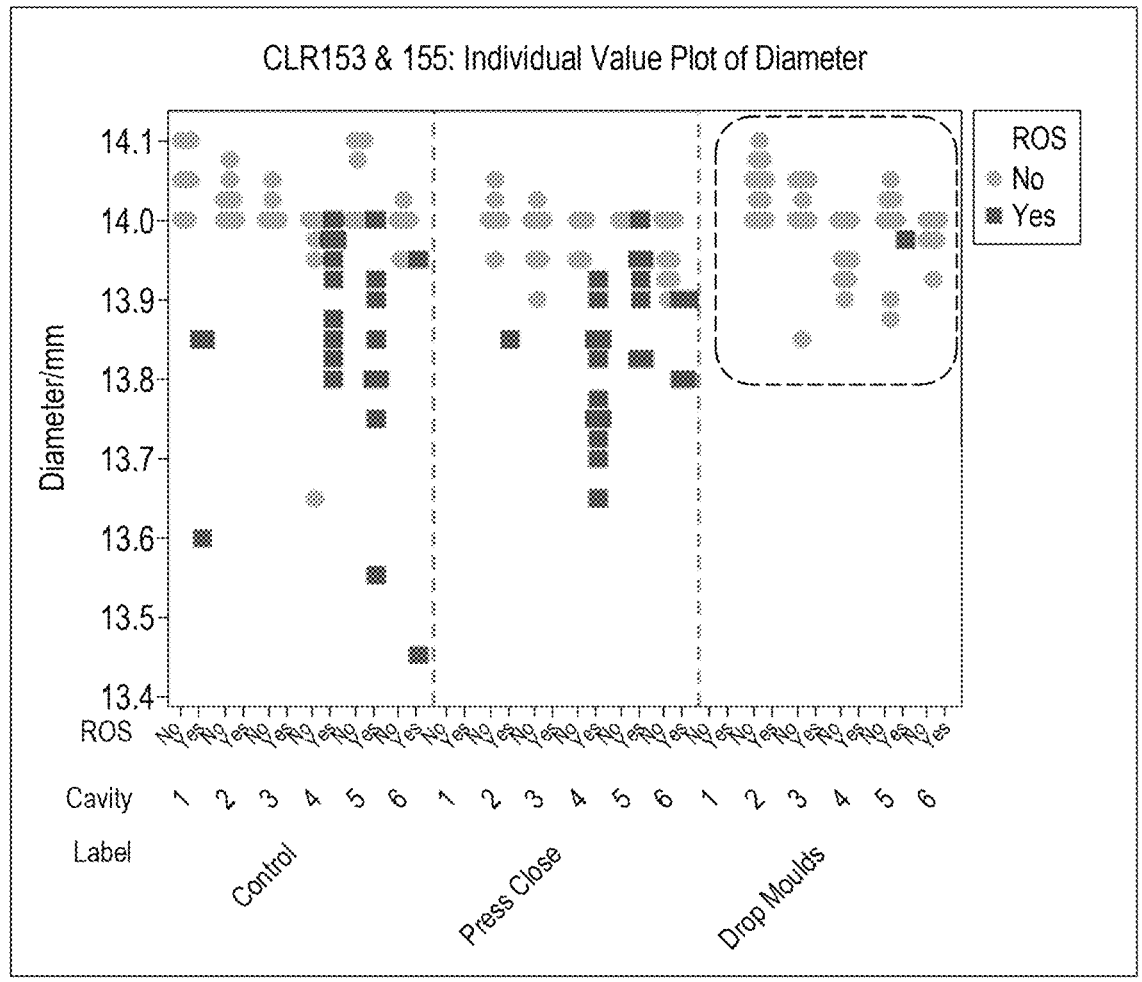
FIG. 8A and FIG. 8B show variations in diameter and wet base curve respectively, for contact lens members produced during a study considering the impact of dropping the male mold member onto the female mold member.
Figure 8B:
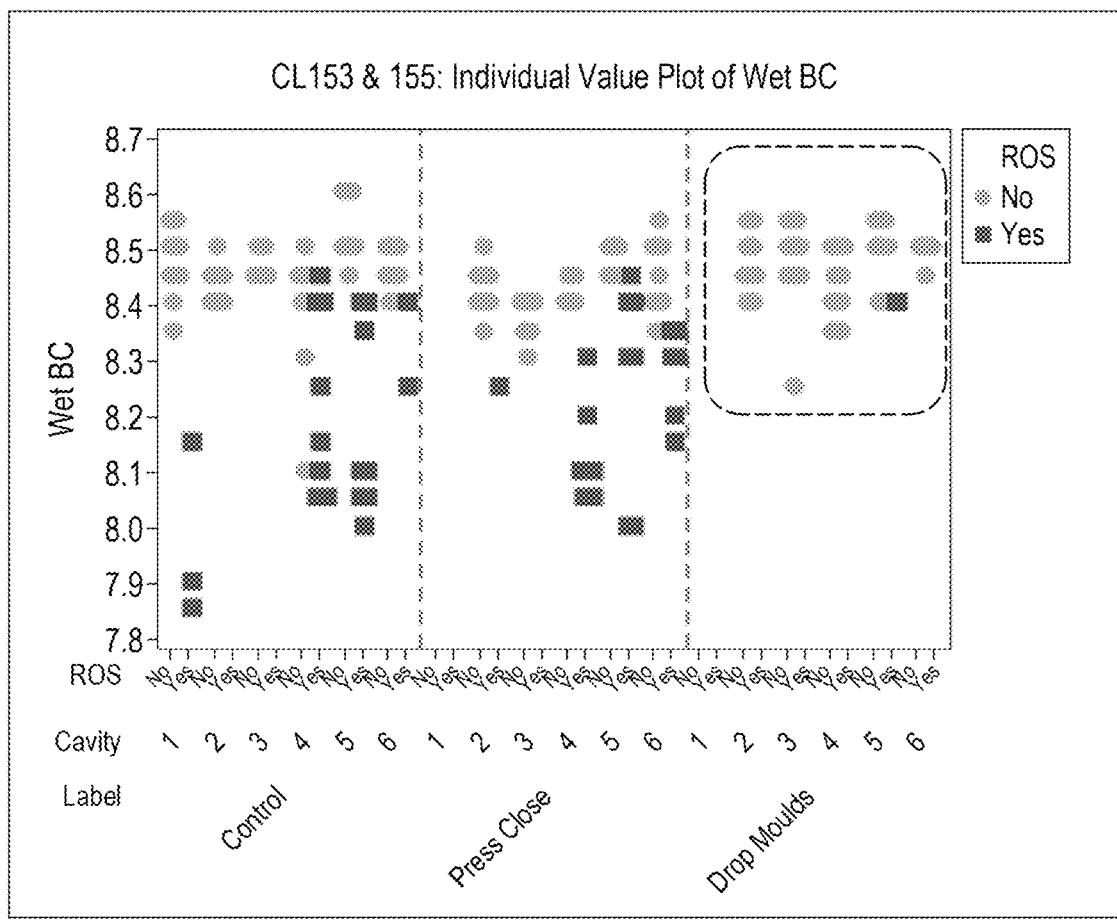

FIG. 8A and FIG. 8B shows the results of a trial formulated to test the impact of placing the male mold member onto the female mold member, pressing the male mold member onto the female mold member, or dropping the male mold member onto the female mold member. The trial used a servo actuator to place the male mold member on the female mold member. In the "control" case, the actuator was programmed to bring the male mold member into contact with the female mold member without any compression, as is done conventionally. In the "press close" case, the servo was programmed to extend to a position 1.5 mm beyond the control or zero position (resulting in all six male moulds being pressed into the females). In the "drop moulds" case the servo was programmed to extend to a position 1.5 mm short of the control or zero position (resulting in the male moulds being "dropped" into the females). All other variables were held constant.

FIG. 8A shows the diameter in mm for each of the six cavities, for each of the control, press close and drop moulds cases. Twenty mold assemblies were closed in each cavity. FIG. 8B shows the wet BC for each of the six cavities, for each of the control, press close and drop moulds cases. Surprisingly, it can be seen that the variation in diameter and base curve is significantly reduced when the male mold is dropped onto the female mold. Two shapes of datapoint are used in FIGS. 8A and 8B. The square/rectangular data points show lenses which suffered from the ROS defect. The circular/elliptical data points show lenses without the ROS defect. It can be seen that the ROS defect is also significantly reduced when the male mold member is dropped onto the female mold member.

Figure 9:
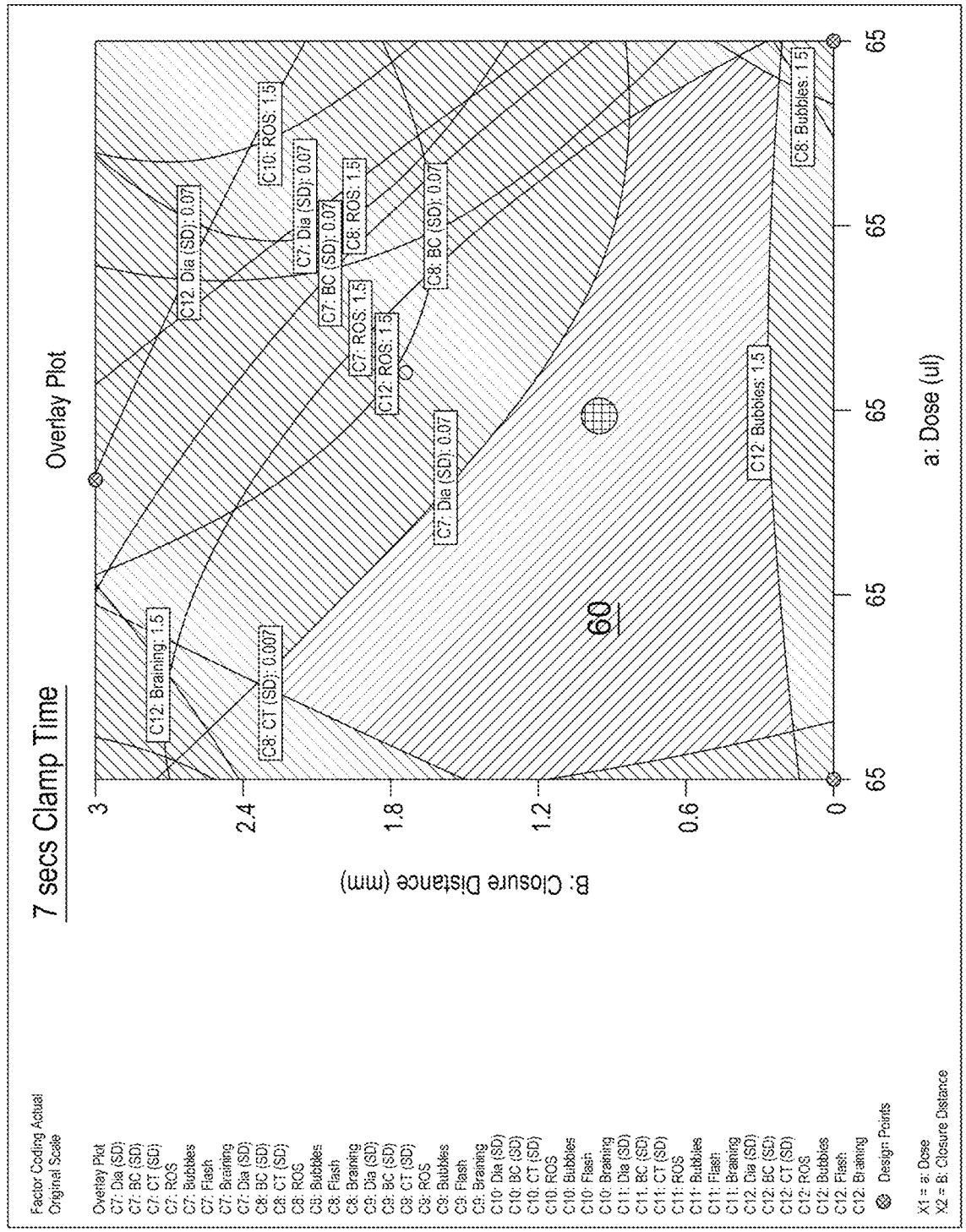
FIG. 9 show the results of a study into the impact of closure distance, dose and clamp time on defect rates in the resulting lens members.
Figure 10A:
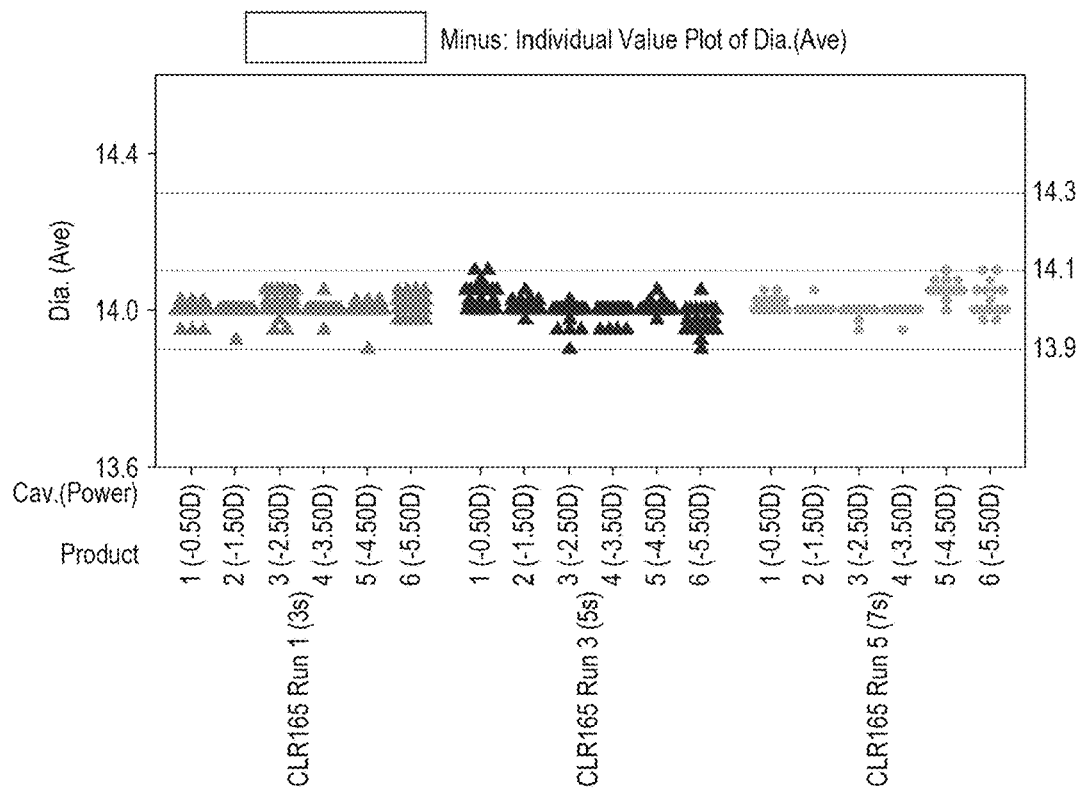
FIG. 10A, FIG. 10B, FIG. 10C and FIG. 10D show the results of a study examining the impact of chosen parameters on defect rates across a range of contact lens members with different corrective powers.
Figure 10B:
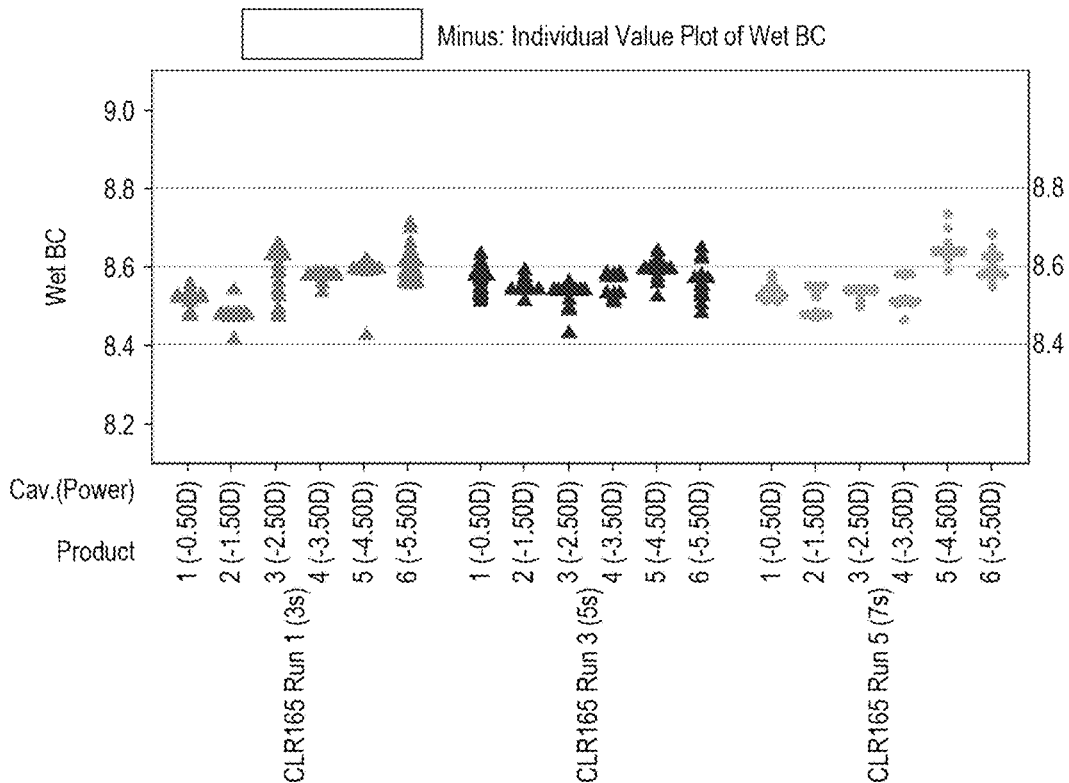
Figure 10C:
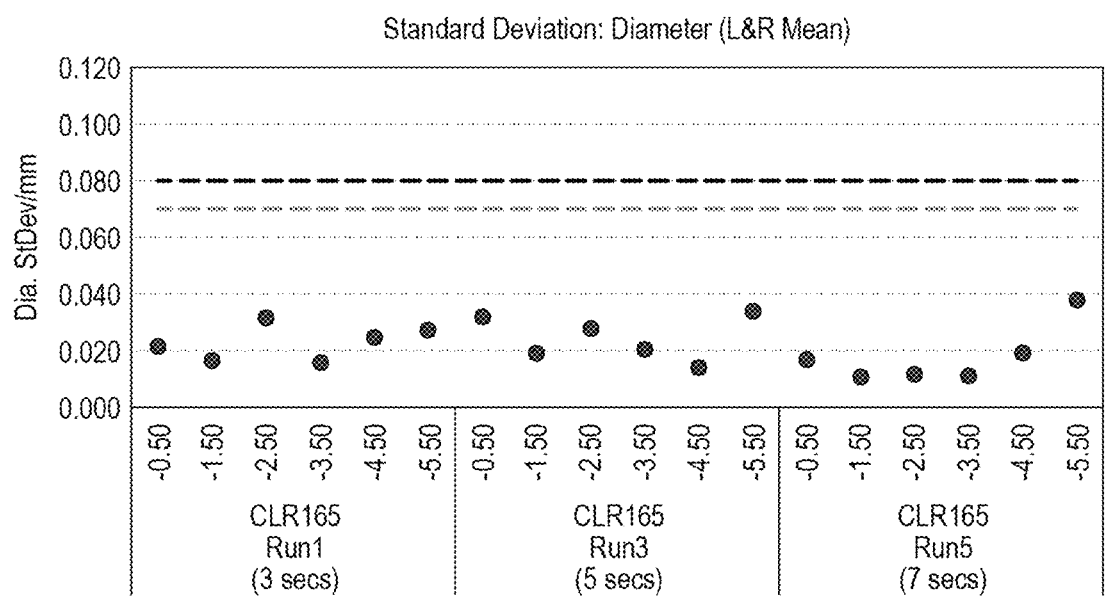
Figure 10D:
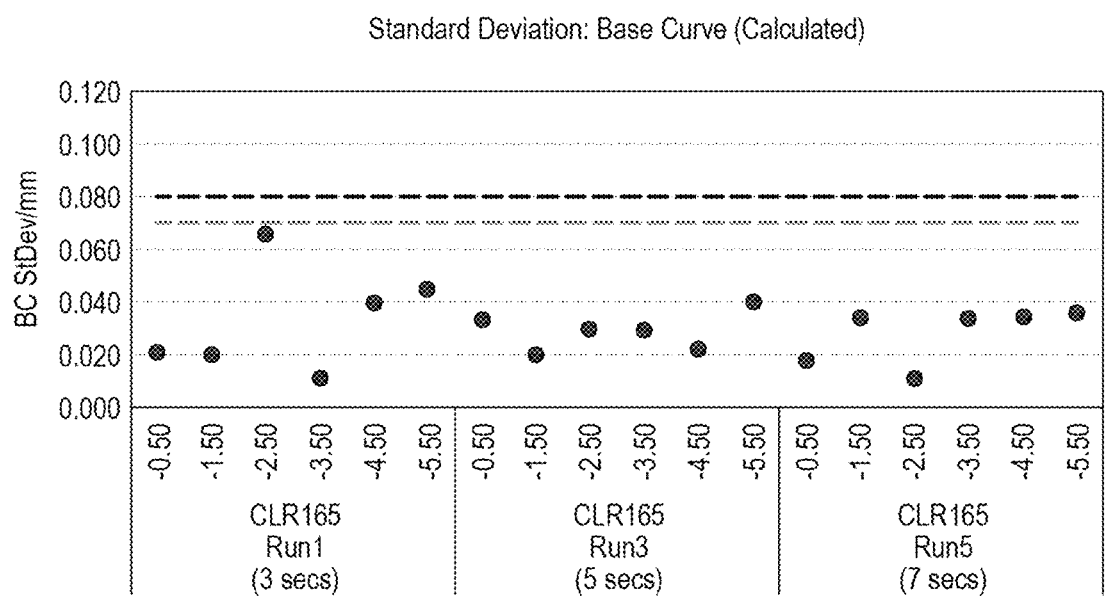

FIG. 9 shows a plot of dose (μl) vs. closure distance (mm) for a clamp dwell time of 7 seconds, as produced by a trial formulated to test the impact of volume of lens precursor dispensed, closure distance (i.e. drop distance) and clamp dwell time on lens defects. The clamp force was 75 N. The volume of lens precursor (dose) was varied in intervals from 40 μl to 60 μl. Closure distance was varied in intervals from 0 mm to 3 mm. Clamp dwell time was varied from 3 seconds to 7 seconds. All other variables were held constant or had no impact on the defect rate. The irregularly shaped region 60 of the graph of FIG. 9 indicates the region of dose vs closure distance in which diameter, SAC and BC standard deviations were less than 0.07 mm, and each of the defects of ROS, RBS, bubbles, flash and braining were present in less than 0.25% of the lenses. At a dose of 44 μl, the region 60 extends over a closure distance from 0.2 mm to 2.3 mm. At a dose of 57 μl, the region 60 extends over a closure distance from 0.2 mm to 1 mm. The results were similar for clamp dwell times of 3 seconds and above.

The following settings were then tested across a power range from −0.5 to −10.0; clamp dwell time 3 seconds, clamp force 75N, 50 μl dosage, 1 mm drop height. These results are shown in FIG. 10A, FIG. 10B, FIG. 10C and FIG. 10D. Twenty-four mold pairs of each power were produced. Good dimensional control was achieved for all cavities across all runs.

For comparison, a previous process (using the same lens material, mold materials and carried out on substantially the same equipment) resulted in only 11 out of 48 cavities achieved a standard deviation of less than 0.07 mm for diameter or base curve. The following settings were used in the previous process: clamp dwell time 0.1 s, clamp force 6N, mold drop height 0 mm (molds placed in contact) and 47 to 50 μl dosage.

Similar results are achieved using the methods and systems and apparatus of the present disclosure when the silicone hydrogel contact lens formulation has the United States Adopted Name (USAN) Somofilcon A, and optionally includes the DAB (4,4'-Diallyloxybenzophenone) monomer.

As used herein, and unless otherwise stated, a range of from X to Y includes the stated endpoints of the range. Thus, a range of from X to Y is interpreted as including X and any value up to and including Y.

Whilst the present disclosure has been described and illustrated with reference to particular embodiments, it will be appreciated by those of ordinary skill in the art that the disclosure lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, whilst of possible benefit in some embodiments of the disclosure, may not be desirable, and may therefore be absent, in other embodiments.

The invention claimed is:

1. A method of producing a silicone hydrogel contact lens mold assembly, the method comprising;
  placing one of a male mold member and a female mold member on the other of a male mold member and a female mold member to form a contact lens mold assembly comprising a contact lens shaped cavity defined between the male mold member and the female mold member, said cavity containing a polymerizable silicone hydrogel contact lens precursor composition; and
  coupling the male mold member and the female mold member together by inserting one or more heated elongate elements into the male and female mold members thereby causing a portion of the male and/or female mold members to become melted or softened, and then withdrawing said one or more heated elongate elements from the male and female mold members, wherein said melted or softened material then cools to form a weld between the male and female mold members; and wherein
  throughout a first time period beginning when the first of said one or more heated elongate elements is inserted into the male and female mold members and continuing until at least 3 seconds after the last of said one or more heated elongate elements is withdrawn from the male and female mold members, the male and female mold members are pressed together by applying a force in the range of from 20 N to 100 N to the male and female mold members.

2. The method of producing a silicone hydrogel contact lens mold assembly according to claim 1, wherein said male mold member and said female mold member comprise polypropylene, and optionally, wherein said polypropylene has a Melt Flow Rate of 19 dg/min at 230° C. and 2.16 kg.

3. The method of producing a silicone hydrogel contact lens mold assembly according to claim 2, wherein said polypropylene has a tensile modulus of 1800 MPa (measured at 1 mm/min) and/or a flexural modulus of 1900 MPa (measured at 1%/minute).

4. The method of producing a silicone hydrogel contact lens mold assembly according to claim 1, wherein said first time period continues until at least 5 seconds after the last of said one or more heated elongate elements is withdrawn from the male and female mold members.

5. The method of producing a silicone hydrogel contact lens mold assembly according to claim 1, wherein said first time period continues for from 3 to 7 seconds after the last of said one or more heated elongate elements is withdrawn from the male and female mold members.

6. The method of producing a silicone hydrogel contact lens mold assembly according to claim 1, wherein the female and male mold members are pressed together by applying a force in the range of from 50 N to 80 N throughout said first time period.

7. The method of producing a silicone hydrogel contact lens mold assembly according to claim 1, wherein said step of placing one of a male mold member and a female mold member on the other of a male mold member and a female mold member comprises dropping one mold member onto the other mold member, and optionally wherein the male mold member is dropped onto the female mold member.

8. The method of producing a silicone hydrogel contact lens mold assembly according to claim 7, wherein the mold member is dropped from a height of from 0.5 mm to 5 mm.

9. The method of producing a silicone hydrogel contact lens mold assembly according to claim 1, wherein a second time period of at least 3 seconds elapses between placing the male mold member on the female mold member and the male and female mold members being pressed together.

10. The method of producing a silicone hydrogel contact lens mold assembly according to claim 1, wherein the male mold member and female mold member form an interference fit when pressed together.

11. The method of producing a silicone hydrogel contact lens mold assembly according to claim 1, wherein the lens shaped cavity defined between the male mold member and the female mold member has a thickness of at least 10 µm when measured at a distance of 50 µm from the peripheral edge of the cavity.

12. The method of producing a silicone hydrogel contact lens mold assembly according to claim 1, wherein the one or more heated elongate elements pass through the male and female mold members.

13. The method of producing a silicone hydrogel contact lens mold assembly according to claim 1, wherein the volume of lens precursor composition in the cavity is from 40 µl to 60 µl.

14. A method of making a silicone hydrogel contact lens member, comprising:
  forming a silicone hydrogel contact lens mold assembly according to the method of claim 1; and optionally,
  exposing the mold assembly to radiation to polymerize the polymerizable silicone hydrogel contact lens precursor composition to produce a contact lens body;
  separating the male mold member from the female mold member, leaving the contact lens body in contact with the male and/or female mold member;
  removing the contact lens body from said male and/or female mold member; and/or
  extracting extractable materials from the contact lens body and/or hydrating the contact lens body to form a silicon hydrogel contact lens member.

15. A system for the production of a silicone hydrogel contact lens mold assembly, the mold assembly comprising a contact lens shaped cavity defined between a male mold member and a female mold member, the system comprising:
  a clamp arranged to compress the mold assembly;
  one or more elongate elements, said one or more elongate elements being mounted for movement relative to the clamp to pass a tip of each elongate element through the male and female mold members while they are being compressed by the clamp, and
  a control system configured to control operation of the clamp and the one or more elongate elements such that throughout a first time period beginning when the first of said one or more elongate elements is inserted into the male and female mold members and continuing until at least 3 seconds after the last of said one or more elongate elements are withdrawn from the male and female mold members, the clamp exerts a force in the range of from 20 N to 100 N on the male and female mold members.

16. The system according to claim 15, further comprising a support configured to retain a first mold member in a substantially fixed location, said first mold member being one of the male mold member and the female mold member, and a second mold member being the other of the male mold member and female mold member; and the clamp comprises a clamp foot arranged to compress the first and second mold members between the clamp foot and the support when the first mold member is retained in the support and the second mold member is placed on the first mold member to define the lens shaped cavity therebetween; and the control system is configured to control operation of the clamp such that throughout the first time period the clamp foot exerts a force in the range of from 20 N to 100 N on the second mold member.

17. The system according to claim 15, further comprising one or more sensors configured to detect the position of the elongate heated elements and/or one or more sensors configured to determine the force exerted on the male and female mold members by the clamp, and wherein the control system is configured to control operation of the clamp and/or elongate heated elements in dependence on a signal received from said one or more sensors.

18. The system according to claim 16, further comprising a second support retaining one of the male or female mold member in a substantially fixed location; a pick up head having the other of the male and female mold member retained on an end thereof, and wherein the control system is configured to control the position of the pick-up head to position its mold member above the other mold member and to release its member from a height of from 1 mm to 3 mm.

* * * * *